US006795794B2

(12) United States Patent
Anastasio et al.

(10) Patent No.: US 6,795,794 B2
(45) Date of Patent: Sep. 21, 2004

(54) METHOD FOR DETERMINATION OF SPATIAL TARGET PROBABILITY USING A MODEL OF MULTISENSORY PROCESSING BY THE BRAIN

(75) Inventors: Thomas J. Anastasio, Urbana, IL (US); Sylvian R. Ray, Urbana, IL (US); Thomas S. Huang, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 31 days.

(21) Appl. No.: 10/087,226

(22) Filed: Mar. 1, 2002

(65) Prior Publication Data

US 2003/0167148 A1 Sep. 4, 2003

(51) Int. Cl.[7] .................................................. G06E 3/00
(52) U.S. Cl. ........................................ 702/181; 706/10
(58) Field of Search ........................... 702/181; 382/228, 382/103; 348/169, 14.09; 704/231; 367/136; 381/92; 600/372; 395/10; 706/10

(56) References Cited

U.S. PATENT DOCUMENTS

| | | | | |
|---|---|---|---|---|
| 5,664,021 | A | | 9/1997 | Chu et al. ...................... 381/92 |
| 5,687,291 | A | * | 11/1997 | Smyth .......................... 395/10 |
| 5,778,082 | A | | 7/1998 | Chu et al. ...................... 381/92 |
| 6,005,610 | A | | 12/1999 | Pingali ......................... 348/169 |
| 6,092,058 | A | * | 7/2000 | Smyth .......................... 706/10 |
| 6,115,480 | A | | 9/2000 | Washizawa ................... 382/103 |
| 6,226,409 | B1 | | 5/2001 | Cham et al. .................. 382/228 |
| 6,314,204 | B1 | | 11/2001 | Cham et al. .................. 382/228 |
| 6,552,963 | B2 | | 4/2003 | Baranek et al. .............. 367/136 |
| 6,567,775 | B1 | | 5/2003 | Maali et al. .................. 704/231 |
| 6,593,956 | B1 | | 7/2003 | Potts et al. ................. 348/14.09 |
| 6,604,072 | B2 | | 8/2003 | Pitman et al. ............... 704/231 |
| 6,609,017 | B1 | * | 8/2003 | Shenoy et al. ............... 600/372 |

OTHER PUBLICATIONS

Christopher A Seguin, Models of neurons in the superior colliculus and unsupervised learning of parameters from the series 1998, University of Illinois, Thesis, pp. 1–250.*

Anastasio, T.J., Patten, P.E., Belkacem–Boussaid, K.: *Using Bayes' rule to model multisensory enhancement in the superior colliculus*. Neural Computation, 12: 1165–1187. (2000).

Grossberg, S., Roberts, K., Aguilar, M., Bullock, D.: *A neural model of multimodal adaptive saccadic eye movement control by superior colliculus*. Journal of Neuroscience, 17:9706–9725. (1997).

Pearson, J.L., Gelfand, J.J., Sullivan, W.E., Peterson, R.M., Spence, L.D.: *Neural network approach to sensor fusion*. SPIE Sensor Fusion, 931: 103–108. (1988).

Rucci, M., Tononi, G., Edelman, G.M.: *Registration of neural maps through value–dependent learning: modeling the alignment of auditory and visual maps in the barn owl's optic tectum*. Journal of Neuroscience, 17: 334–3452. (1997).

Rucci, M., Edelman, G.M., Wray, J.: *Adaptation of orienting behavior: from the barn owl to a robotic system*. IEEE Transactions on Robotics and Automation, 15: 16–110. (1999).

(List continued on next page.)

Primary Examiner—John Barlow
Assistant Examiner—Victor J. Taylor
(74) Attorney, Agent, or Firm—Greer, Burns & Crain, Ltd.

(57) ABSTRACT

A method of determining spatial target probability using a model of multisensory processing by the brain includes acquiring at least two inputs from a location in a desired environment where a first target is detected, and applying the inputs to a plurality of model units in a map corresponding to a plurality of locations in the environment. A posterior probability of the first target at each of the model units is approximated, and a model unit with a highest posterior probability is found. A location in the environment corresponding to the model unit with a highest posterior probability is chosen as the location of the next target.

40 Claims, 10 Drawing Sheets

OTHER PUBLICATIONS

Anastasio, T.J., Patten, P.E., Belkacem–Boussaid, K.: *Using Bayes' rule to model multisensory enhancement in the superior colliculus*. Neural Computation, 12: 1165–1187. (2000).

Grossberg, S., Roberts, K., Aguilar, M., Bullock, D.: *A neural model of multimodal adaptive saccadic eye movement control by superior colliculus*. Journal of Neuroscience, 17: 9706–9725. (1997).

Pearson, J.L., Gelfand, J.J., Sullivan, W.E., Peterson, R.M., Spence, L.D.: *Neural network approach to sensor fusion*. SPIE Sensor Fusion, 931: 103–108. (1988).

Rucci, M., Tononi, G., Edelman, G.M.: *Registration of neural maps through value–dependent learning: modeling the alignment of auditory and visual maps in the barn owl's optic tectum*. Journal of Neuroscience, 17: 334–3452. (1997).

Rucci, M., Edelman, G.M., Wray, J.: *Adaptation of orienting behavior: from the barn owl to a robotic system*. IEEE Transactions on Robotics and Automation, 15: 16–110. (1999).

* cited by examiner

METHOD FOR DETERMINATION OF SPATIAL TARGET PROBABILITY USING A MODEL OF MULTISENSORY PROCESSING BY THE BRAIN

STATEMENT OF GOVERNMENT INTEREST

This invention was made with Government support under Contract Nos. IBN 92-21823 and IBN 00-80789 awarded by the National Science Foundation and Contract No. N00014-01-1-0249 awarded By the Office of Naval Research. The Government has certain rights in the invention.

FIELD OF INVENTION

The present invention generally relates to a method for determining the probability that an event has occurred at a set of spatially localized positions in the environment, and more particularly to modeling of multisensory processing in brain maps.

BACKGROUND

All vertebrate animals constantly monitor the environment by orienting their sensory organs toward the locations of events of potential survival value. Neurobiological evidence indicates that animals utilize multisensory integration to detect the targets of orienting movements. It further indicates that the ability to integrate multisensory input is innate, and emerges as the developing brain interacts with the environment.

Figure 1:
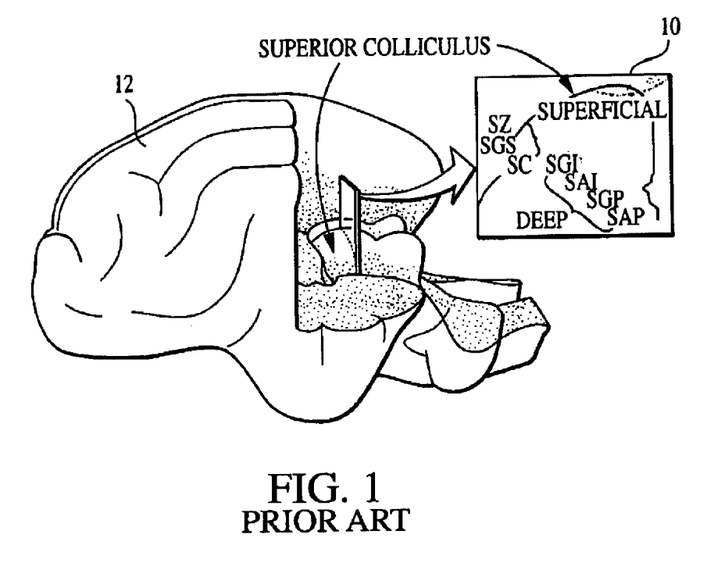
FIG. 1 is a diagram showing the superior colliculus of the brain.

The superior colliculus (SC) is a major site of multisensory integration in the mammalian brain. The SC, as shown in FIG. 1, is located in the mammalian midbrain, and is homologous to the optic tectum of non-mammals. On grounds of differing connectivity and function, it can be divided into superficial and deep layers. The deep SC integrates multisensory input and participates in the generation of saccadic (rapid) eye movements. The superficial SC receives only visual input and does not participate in saccade generation.

The deep SC in mammals receives convergent inputs from the visual, auditory, and somatosensory systems. Sensory input arrives from many sub-cortical and extra-primary cortical regions of the brain. The deep SC sends its outputs to premotor circuits in the brainstem and spinal cord that control movements of the eyes and other structures. Neurons in the SC are organized topographically according to their receptive fields. Maps for the various sensory modalities are in register. The motor output of the SC is also topographically organized. Activation of neurons in a localized region of the SC leads, for example, to a saccade of a stereotyped direction and magnitude.

Multisensory enhancement (MSE) is a dramatic form of multisensory integration, in which the response of an SC neuron to an input of one sensory modality can be greatly increased by input of another sensory modality. MSE was first identified in the optic tectum of the rattlesnake, where visual and infrared stimuli can affect the activity of the same neurons. Percent multisensory enhancement is computed as:

$$\%MSE = [(CM - SM_{max})/SM_{max}] \times 100 \qquad (1)$$

where CM is the combined-modality response and $SM_{max}$ is the larger of the two unimodal responses. Percent MSE can range upwards of 1000%. Percent MSE is larger when the single-modality responses are smaller. This property is known as inverse effectiveness.

MSE is dependent upon the spatial and temporal relationships of the interacting stimuli. Stimuli that occur at the same time and place are likely to produce response enhancement, while stimuli that occur at different times and/or places are not likely to produce enhancement. MSE is also observed at the behavioral level. For example, a cat is much more likely to orient toward the source of a weak stimulus if it is coincident with another stimulus, even a weak one, of a different modality. MSE clearly helps animals detect targets. It is suggested that the function of MSE is to enhance the target-related activity of deep SC neurons.

Multiple observations from a variety of sensors increase the amount of information available for automated tasks such as detection and localization of events in the environment. Fusing inputs from multiple sensors involves transforming different sensor readings into a common representational format, and then combining them in such a way that the uncertainty associated with the individual sensor observations is reduced.

There are several components to the technological problem of muiltisensor fusion that have parallels with the neurobiology of the SC as described above. For example, sensor registration and alignment are issues in a multiple sensor environment. So is the implementation of a suitable, common representational format. The SC appears to solve both of these problems through the use of common topographical representations in the form of sensory maps, which allow multisensory alignment and implementation of common representational format.

SUMMARY OF THE INVENTION

The present invention relates to a method of determining spatial target probability using a model of multisensory processing by the brain. The method includes acquiring at least two inputs from a location in a desired environment where a first target is detected, and applying the inputs to a plurality of model units in a map corresponding to a plurality of locations in the environment. A posterior probability of the first target at each of the model units is approximated, and a model unit with a highest posterior probability is found. A location in the environment corresponding to the model unit with a highest posterior probability is chosen as the location of the next target.

DETAILED DESCRIPTION OF THE INVENTION

Figure 2:
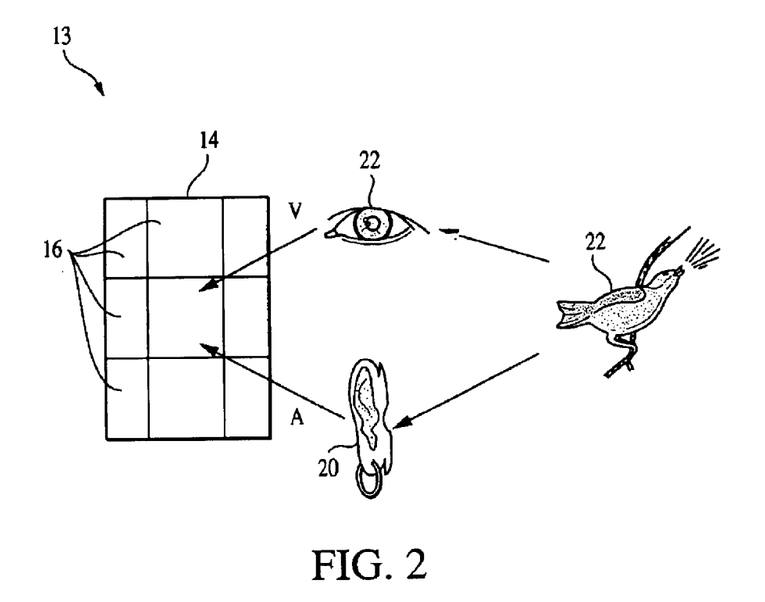
FIG. 2 is a model representation of the superior colliculus of FIG. 1 in accordance with an embodiment of the present invention.

Turning now to FIG. 2, the present invention relates to a model of the superior colliculus (SC) 10 of a vertebrate brain 12 (shown in FIG. 1), which integrates multisensory input and guides orienting movements. The model 13, as in the SC 10 of the brain 12, are organized as a map 14 having a plurality of grids or units 16. Each unit 16 on the map 14 represents a collicular neuron that receives multisensory input from its corresponding location in the environment. The units 16, i.e., the model SC units 16 use sensory inputs such as video (V) 18 and audio (A) 20, for example, to compute the probability that something of interest, i.e., a target 22, has appeared in the surroundings.

The model 13 in accordance with one embodiment of the present invention approximates Bayes' rule for computing the probability of a target. Specifically, the SC units 16 in the map 14 approximate P(T|V,A), which is the conditional probability of a target (T) given visual (V) and auditory (A) sensory input. The Bayes' rule for computing the probability of a target given V and A is as follows:

$$P(T|V,A) = [P(V,A|T)/P(V,A)]P(T) \quad (1)$$

Bayes' rule essentially computes the conditional posterior probability of the target given sensory input P(T|V,A) by modifying the unconditional prior probability of the target P(T) on the basis of sensory input V and A. The conditional probability P(V,A|T) is the likelihood of observing some combination of V and A given the target. The unconditional probability P(V,A) is the likelihood of observing the same combination of V and A under any circumstances. Thus, Bayes' rule computes P(T|V,A) by multiplying P(T) by the ratio of P(V,A|T) to P(V,A). For example, if in the absence of sensory input the expectation of a target is 10%, then P(T) equals 0.1. If some input, say V=20 and A=25, is observed, and if this combination is twice as likely when associated with a target as under general circumstances, then the ratio of P(V,A|T) to P(V,A) is 2. On the basis of this sensory input, Bayes' rule states that P(T|V,A) should equal 0.2. Thus, the prior target probability P(T)=0.1 has been modified by the sensory input to the posterior target probability P(T|V,A)=0.2. In other words, on the basis of the sensory input received, the chances of a target are increased from 10% to 20%.

Figure 3:
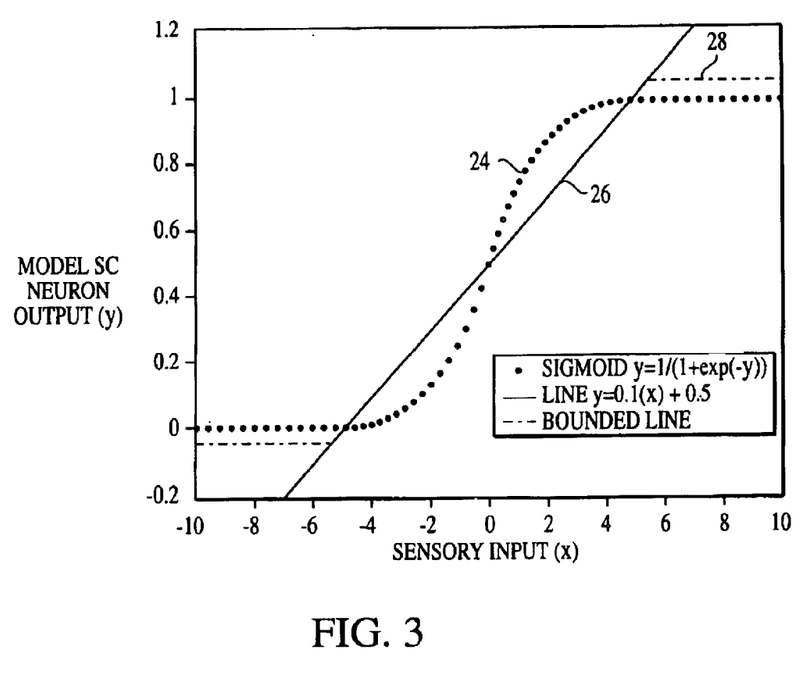
FIG. 3 is a graph illustrating functions for approximating Bayes' rule in accordance with an embodiment of the present invention.

Turning now to FIG. 3, the posterior probability P(T|V,A) computed using Bayes' rule appears generally as an S shaped curve 24 when plotted against A and V. For certain likelihood distribution types (e.g. Poisson, Gaussian), the sigmoid curve [y=1/(1+exp(−x))] can give P(T|V,A) exactly. For other types of unimodal likelihood distributions, or in cases where the likelihood distribution type cannot be specified, the sigmoid can provide a good approximation to the true posterior probability. Even a line 26 or a bounded line 28 that comes close over most of the S-curve can provide an adequate approximation to the true posterior probability for certain applications. These simple functions can be programmed into a computer, for example, and made to approximate the posterior probability P(T|V,A) when V and A are entered.

Figure 4:
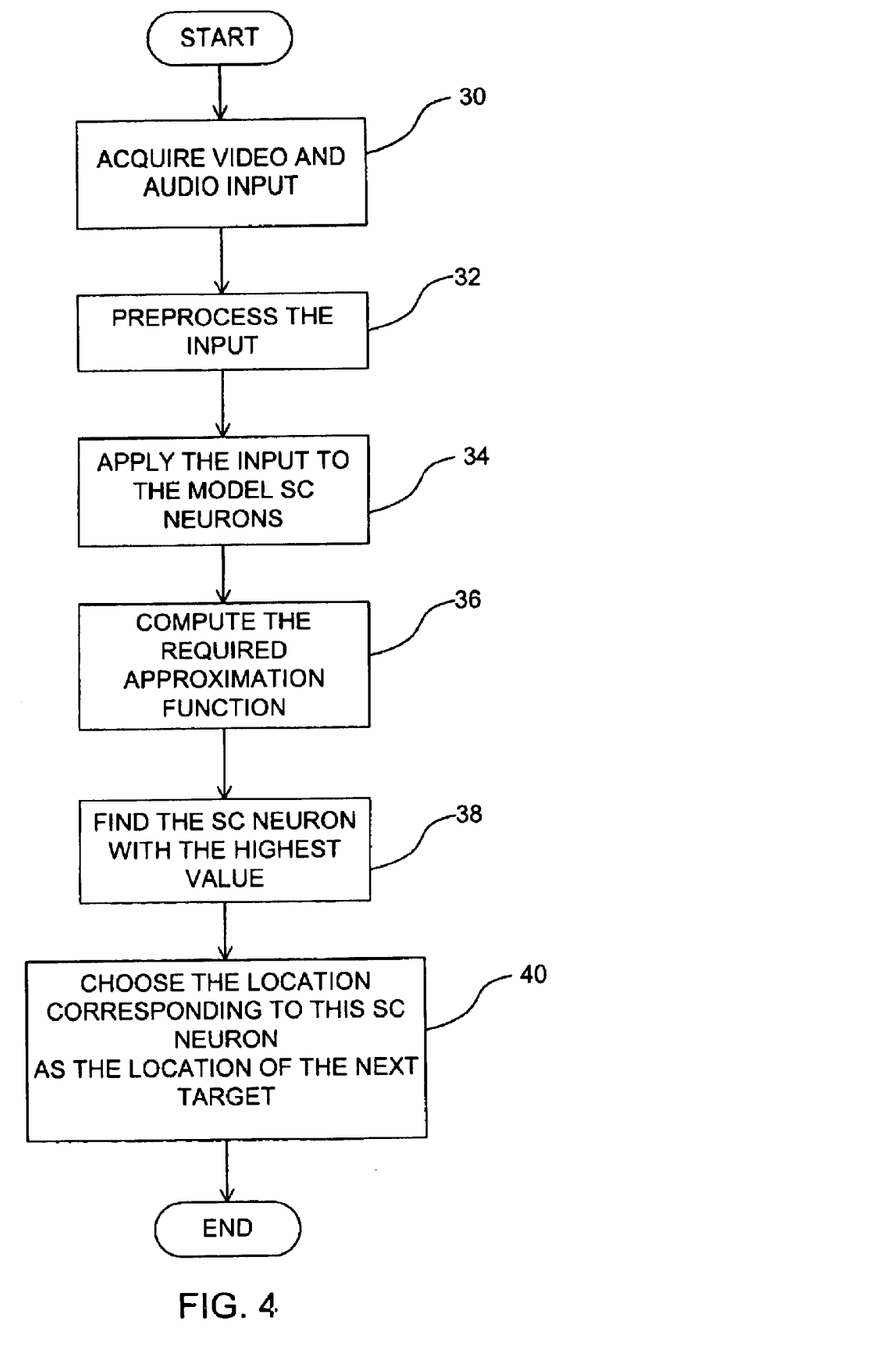
FIG. 4. is a flowchart for illustrating a method for approximating Bayes' rule in accordance with an embodiment of the present invention.

Turning now to FIG. 4, the approximation model determines target probability by first acquiring at least two separate inputs, such as video and audio input, from the environment (block 30). The inputs are then preprocessed (block 32). Preprocessing can take various forms depending upon the type of sensory input used. For the self-aiming camera implementation described below, the video input is preprocessed to detect moving objects, and the audio is preprocessed to detect sound sources. The preprocessed sensory inputs are then applied to the SC units 16 (block 34) in the map 14 (best shown in FIG. 2). Inputs are then used to compute the approximation function selected from one of the functions described above, for example, sigmoid or linear (block 36). Based on this computation, the model SC unit 16 with the highest value is found (block 38). The location in the environment corresponding to this SC unit 16 is then chosen as the location of the next target (block 40).

The model 13 in accordance with another embodiment of the present invention estimates Bayes' rule for calculating target probability by using back-propagation which, as known in the art, is a supervised neural network learning algorithm. Generally, back-propagation is used to train neural networks having input units, output units, and units in between called hidden units. All units are sigmoidal. The input units send their activity to the hidden units, and the hidden units send their activity to the output units. The hidden and output units can also receive a bias input, which is an input that has activity 1 all the time. All the connections between the input, output, and hidden units have weights associated with them. Back-propagation adjusts the values of the weights in order to achieve the desired output unit response for any input pattern. In the estimation method, the SC units 16 are the output units of neural networks that also have input and hidden units. The back-propagation algorithm is used to iteratively adjust the weights of the hidden and the output units to achieve the desired output.

Figure 5:
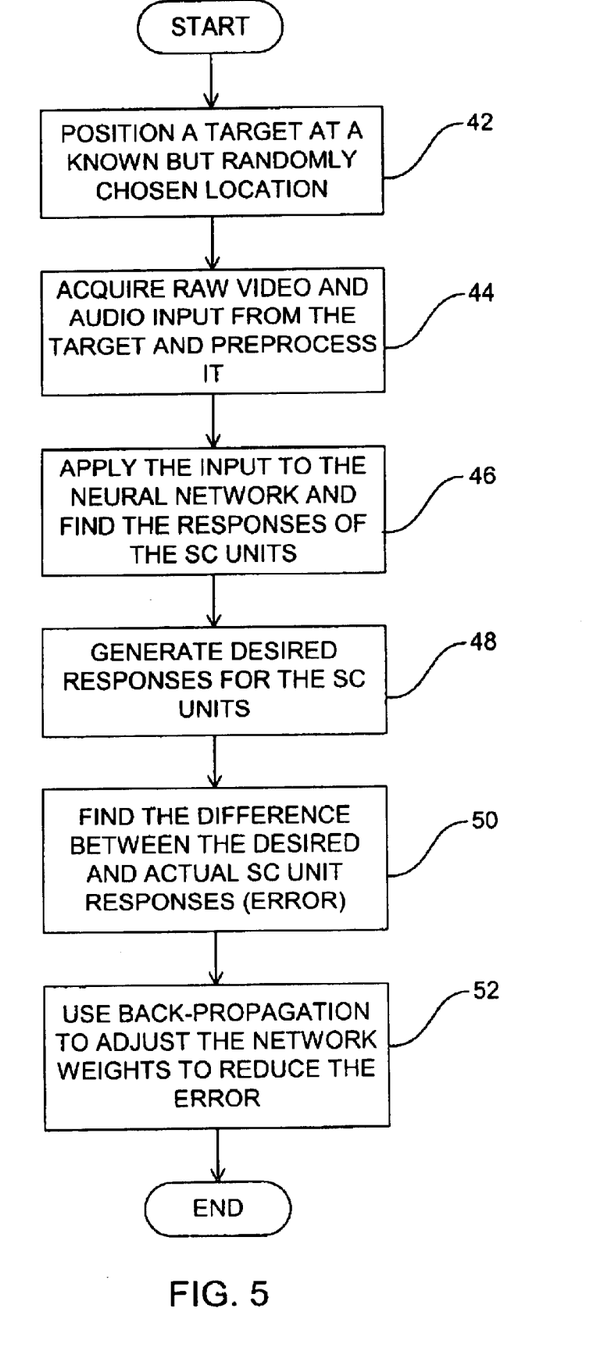
FIGS. 5 and 6 are flowcharts for illustrating a method for estimating Bayes' rule in accordance with an embodiment of the present invention.
Figure 6:
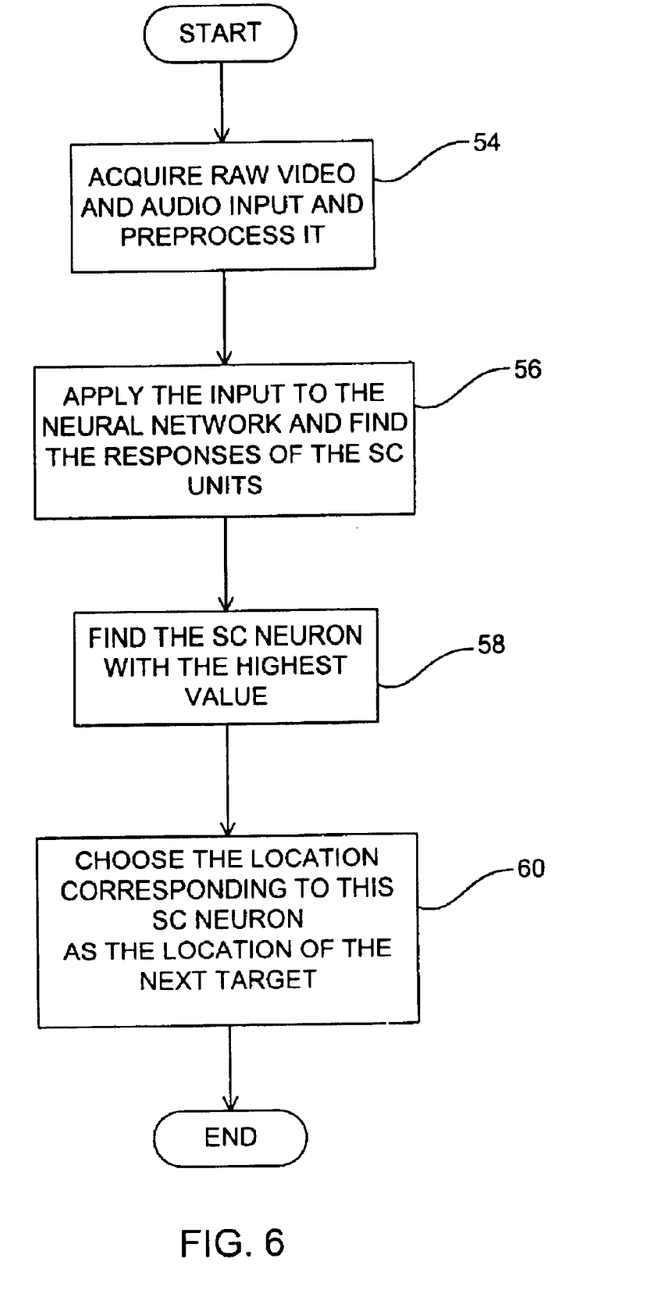

Turning now to FIGS. 5 and 6, the estimation model includes a training phase and an acquisition phase. The training phase as shown in FIG. 5 involves positioning a target at a known but randomly chosen location (block 42), and acquiring video and audio input from the target and preprocessing it (block 44). The input is applied to the neural network and the responses of the SC units 16 are found (block 46). Then desired responses for the SC units 16 (block 48) are generated. The desired response is 1 if the known target location corresponds to the location of the SC unit 16, and 0 for the other SC units. Subsequently, the difference between the desired and actual SC unit responses, i.e. the error, is found (block 50). Thereafter, back-propagation is used to adjust the network weights to reduce the error (block 52).

Referring to FIG. 6, the acquisition phase includes acquiring raw video and audio input and preprocessing it (block 54), and applying the input to the neural network and finding the responses of the SC units 16 (block 56). Then, the SC unit 16 with the highest value is found (block 58). Using this information, the location corresponding to the SC unit 16 with the highest response value is chosen as the location of the next target (block 60).

In accordance with another embodiment of the present invention, an unsupervised adaptive algorithm is used to determine the target probability. In the unsupervised algorithm model, "cortical" input is used to influence the multisensory responses of the SC unit 16 in a way that is consistent with neurobiology. It has been shown in recent experimental work by others that multisensory enhancement in real SC neurons of the brain depends not only upon sensory input but also upon input from the cortex of the brain. Likewise, the present adaptive algorithm incorporates influences other than direct sensory inputs to approximate target probability.

Figure 7:
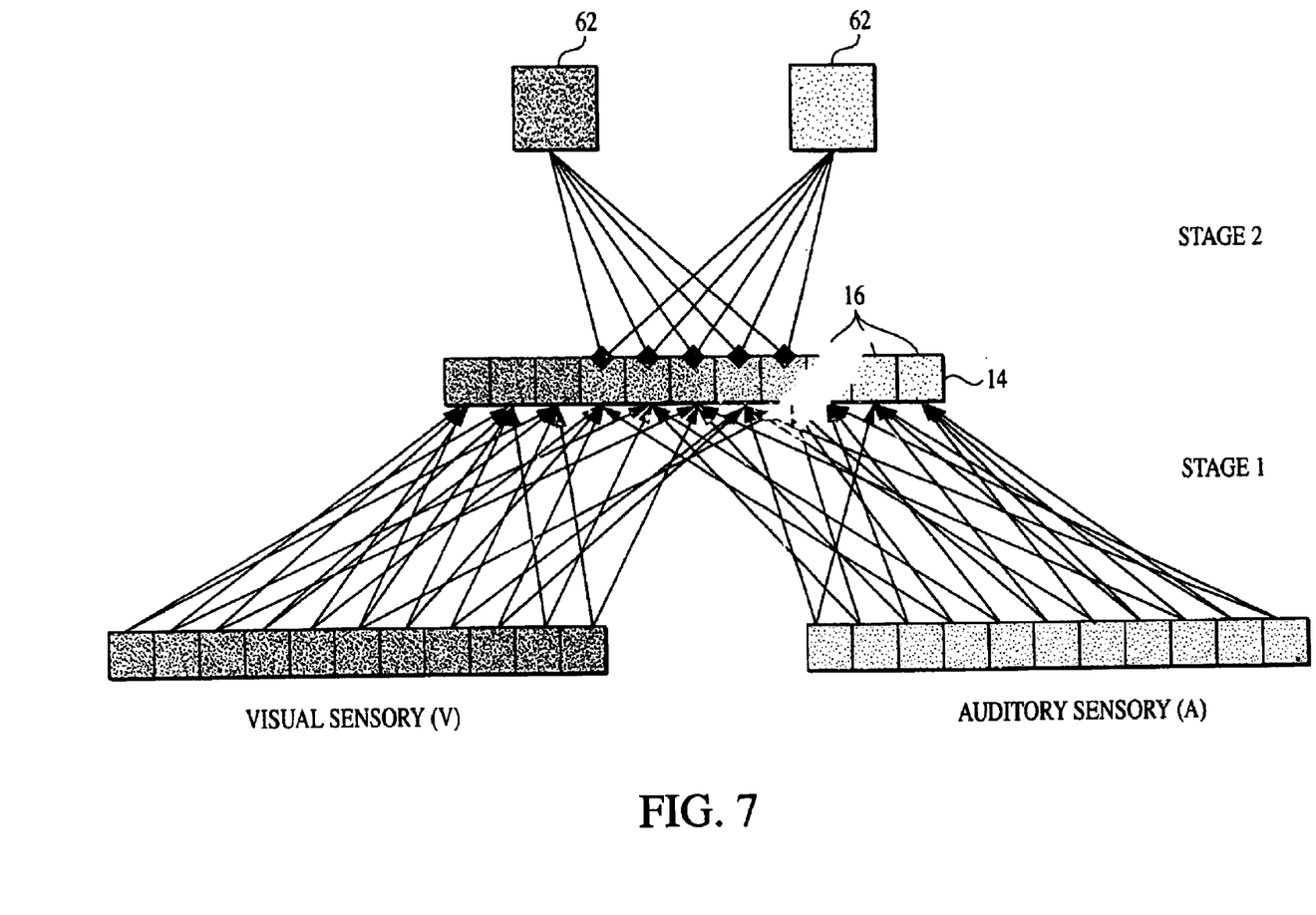
FIG. 7 is a diagram illustrating two stages of an unsupervised algorithm for approximating target probability in accordance with an embodiment of the present invention.

Turning now to FIG. 7, the present unsupervised algorithm for approximating target probability includes two stages. The first stage involves an unsupervised learning mechanism that increases the amount of information transmitted from the sensory inputs, audio (A) and video (V), for example, to the SC unit 16 of the model SC 13. This mechanism is known in the art as the Kohonen mechanism, which has been shown to increase information transmission in neural networks. The Kohonen mechanism is unsupervised, meaning that it would take the sensory inputs (such as audio and video) and automatically adjust the model SC 13 to increase the amount of information that is transmitted to it from the input. This is accomplished by adjusting the connection weights from the V and A inputs to the SC units 16 in such a way that individual SC units become specialized for specific inputs. For example, the Kohonen algorithm might cause one SC unit 16 to become specialized for video input from the extreme left side of the environment, and another to become specialized for audio input coming straight ahead. For very certain (not noisy) inputs, all the SC units 16 will become specialized for particular locations in the environment, and almost all of them will become specific for one modality or the other (V or A). The SC units 16 in this case can give a near maximal amount of information about the input. These units 16 can indicate not only where the target is but also of what modality it is.

If the inputs are not so certain (noisy), then the Kohonen algorithm will cause more of the SC units 16 to become bimodal and respond to both V and A. These SC units 16 would be less informative because they could indicate where the target is but not of which modality it is. Thus, the Kohonen algorithm will do the best it can with the input it is given to increase the amount of information that is transmitted to the SC units 16 from the V and A input units.

In the second stage of the present unsupervised algorithm, a separate set of cortical units 62, representing cortical neurons, learns in an unsupervised way to modulate the strength of the sensory inputs to the model SC units 16. The cortical units 62 can be selective for any type of stimulus such as video and audio, or other specialized units such as those that are specific for images of automobiles, for example, or other types of targets of particular interest.

Learning at the second stage is based on correlation between the activities of the model SC 13 and cortical units 62, and on anti-correlation between cortical units and the sensory inputs. The learning strategy at the second stage is based on the idea that the model SC units 16 compute target probability. For a multisensory neuron of the brain, target probability is much higher if inputs of two separate modalities are active together than if only one or the other is active alone. Another input of a completely separate modality can greatly increase target probability, even if it is weak. The goal for the cortical units 62, then, is to enhance the sensory inputs to model SC units 16 of separate modalities.

Cortical units 62 modulate the sensory inputs to the model SC units 16 by multiplying their weights. For example, the video input to an SC unit 16 would be $c_v w_v V$, where $c_v$ is the amount of cortical modulation of that sensory weight $w_v$. In the learning process, an active cortical unit 62 will increase its modulation of a sensory input to an SC unit 16 if the SC unit is also active but the sensory input is inactive. If the SC unit 16 and the sensory input are both active then the cortical unit 62 will decrease its modulation of the sensory input. For example, when an SC unit 16 receives multisensory video and audio input after stage one training, and a target appears that provides a video input but produces no audio input, that SC unit will be active because it receives both video and audio input and the video input is active. A cortical unit 62 sensitive to video will also be active. Because the activity of the SC unit 16 and the cortical unit 62 are correlated, the cortical unit will change its level of modulation of the sensory inputs, accordingly as they are anti-correlated. Specifically, the cortical unit 62 will decrease its modulation of the video input (because the cortical unit and the video input are correlated) but increase its modulation of the auditory input (because the cortical unit and the audio input are anti-correlated).

Figure 8:
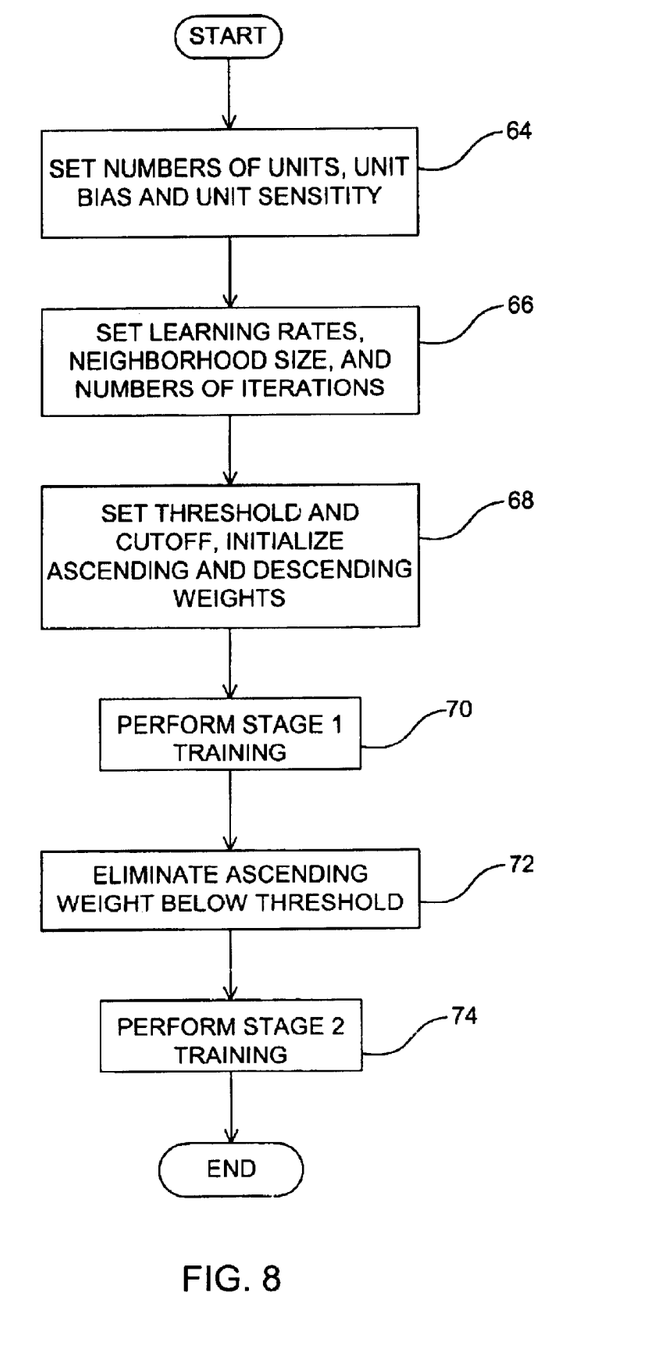
FIGS. 8–10 are flowcharts for illustrating a method for approximating target probability using the unsupervised algorithm for approximating target probability.

Turning now to FIG. 8, the preferred embodiment for implementing the two-stage algorithm for approximating target probability involves iterative procedures that begin after certain parameters in the model have been set. The structure of the neural network model 13 is determined in block 64, in which the number of SC unit 16 is set, and the bias weight and sensitivity of each SC unit are assigned. All the SC units 16 in the two-stage model are sigmoidal, where output y is related to input x by: $y=1/(1+\exp(-gx))$. The input x is the weighted sum of its inputs from V and A and from the bias. The bias weight $w_b$ is the same fixed constant for all SC units 16. The sensitivity g is another fixed constant that is the same for all SC units 16. These fixed constants ($w_b$ and g), along with the number of SC units 16, are set in block 64.

Further, the parameters of iterative learning are set (block 66). Stage-one and stage-two learning are both iterative, where small changes to network weights are made at each iteration. The learning rate parameters, one for each stage of learning, are set to make these adjustments of the appropriate size. The neighborhood size is pertinent to stage-one learning. It determines how many SC units 16 adjacent to the winning SC unit are also trained (see block 80 below). The numbers of training iterations for each stage, both learning rates, and the neighborhood size for stage one are also set in block 66.

Before stage one and stage two training can begin, the threshold and cutoff must be set and the ascending and descending weights must be initialized (block 68). The ascending weights are the weights of the connections from the sensory inputs V and A to the SC units 16. These weights are initialized to positive, uniformly distributed random numbers. The ascending weights are trained during stage one. Any weight that had not reached a level greater than the threshold following stage-one training is set to zero. The descending weights are the weights from the cortical units 62 that modulate the connections from the sensory inputs A and V, as explained above. These weights are initialized to zero and are trained during stage two. Stage two training, described below, depends in part upon correlation between the activity of SC units 16 and cortical units 62. After stage one training, a model SC unit 16 is considered to be activated by sensory input A and/or V if its response to sensory input exceeds the cutoff. The threshold and cutoff parameters are set, and the ascending and descending weights are initialized in block 68.

Once the parameters have been set and the weights initialized (blocks 64, 66, and 68) the stage one learning process (described below in more detail) is performed (block 70). Stage one operates on the ascending weights. Immediately following stage-one training the ascending weights are thresholded, such that any ascending weight with value less than the threshold is set to zero (block 72). Then the stage two learning process (described below in more detail) is performed (block 74).

Figure 9:
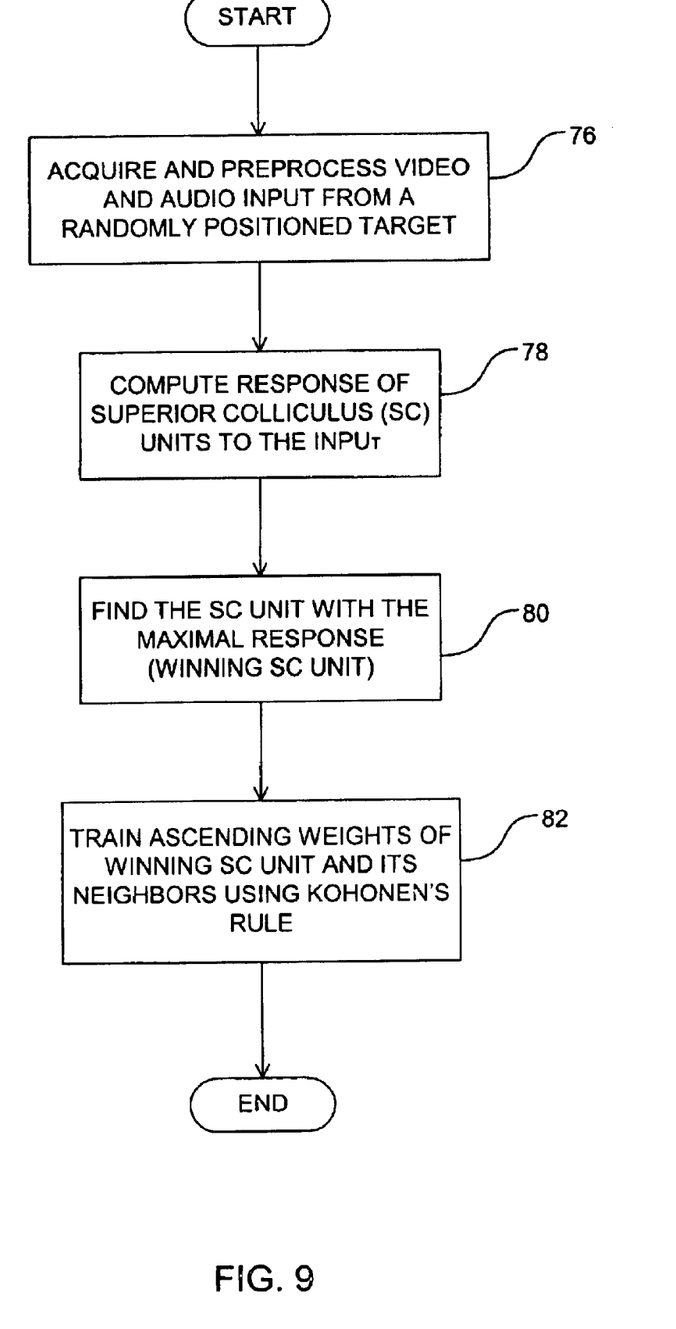

Referring now to FIG. 9, each iteration of the stage one learning process begins by acquiring and preprocessing the video and audio inputs from a randomly positioned target (block 76). These V and A inputs are sent to the SC units 16 over the ascending connections. As explained above, the sigmoidal SC units 16 use the weighted sum of these inputs to compute their responses (block 78). Then the SC unit 16 with the maximal response is found (block 80). The unit with the maximal response is referred to as the 'winning' SC unit. The ascending weights of the winning SC unit 16 and its neighbors are trained using Kohonen's rule (block 82). The neighbors of an SC unit 16 are simply the other SC units that are near it in the network. The number of neighbors trained in stage one is determined by the neighborhood-size parameter set in block 77 (see FIG. 8). Kohonen's rule basically adjusts the ascending weights to the winning SC unit 16 and its neighbors so that they become even more specialized for the current input.

Figure 10:
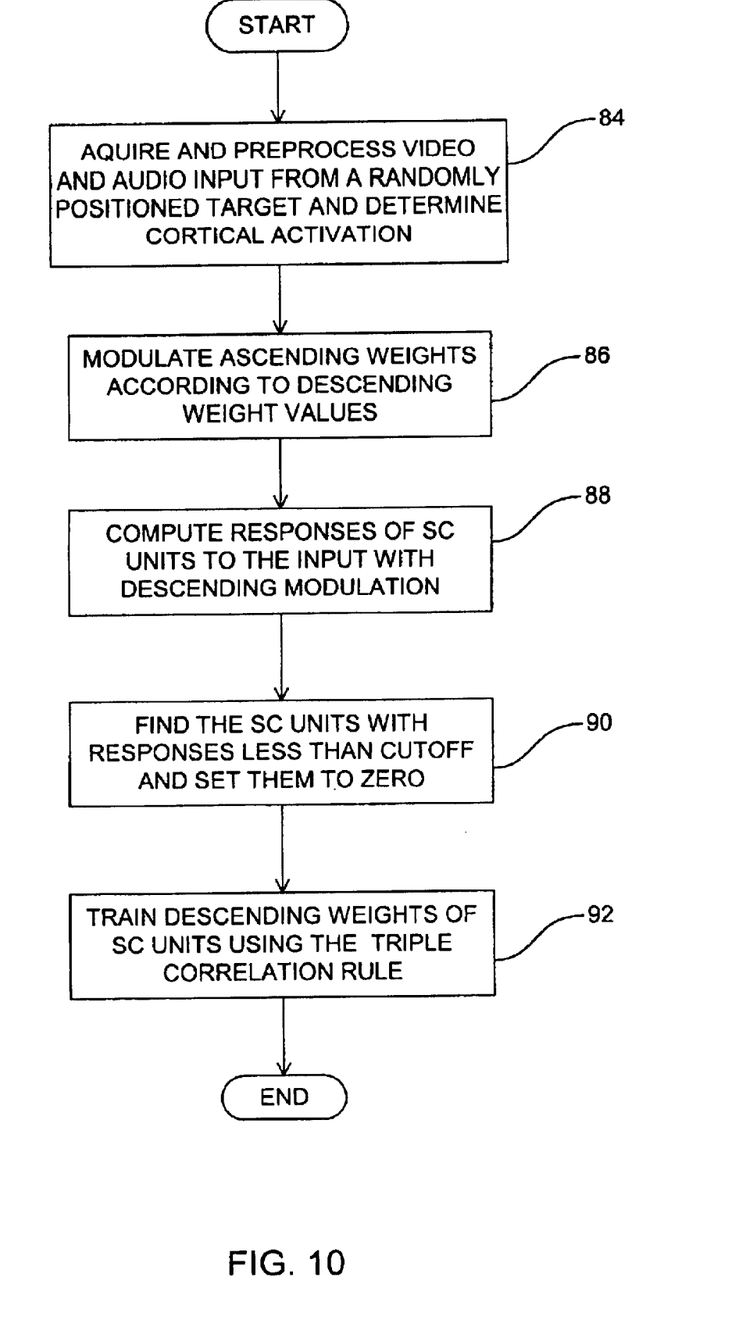

Turning to FIG. 10, each iteration of stage-two learning process begins by acquiring and preprocessing the video and audio inputs from a randomly positioned target, and using that input to determine cortical activation (block 84). The term 'cortical' is meant to indicate that these units 62 are at a high level, as they are in the cortex of the mammalian brain, and the properties of the cortical units 62 can vary over a very broad range. For example, the cortical units can act as pattern recognizers, and can be specialized for particular types of targets like humans or airplanes. So far as applied here, the cortical units 62 simply register the modality of the target, whether it is visual, auditory, or both. A visual cortical unit 62, for example, would be active whenever the video input is active. Block 84 indicates that the activity of the cortical units 62 is dependent upon the video and audio inputs. The cortical units 62 send descending connections to the model SC units 16, and more specifically, to the connections onto the SC units from the V and A sensory inputs. As explained above, an active cortical unit 62 can modulate the weights of the ascending connections by multiplying the value of the ascending weight by that of the descending weight (block 86). After any cortical descending modulation of ascending weights is taken into account, the responses of the SC units 16 to the ascending input is computed (block 88).

Then the SC units 16 with responses less than cutoff are found and set to zero (block 90). Descending weights of SC units 16 are then trained using the following triple correlation rule (block 92):

If an SC unit 16 and a cortical unit 62 are both active, then increase the descending weights to inactive ascending input synapses, and decrease the descending weights to active ascending input synapses.

Figure 11:
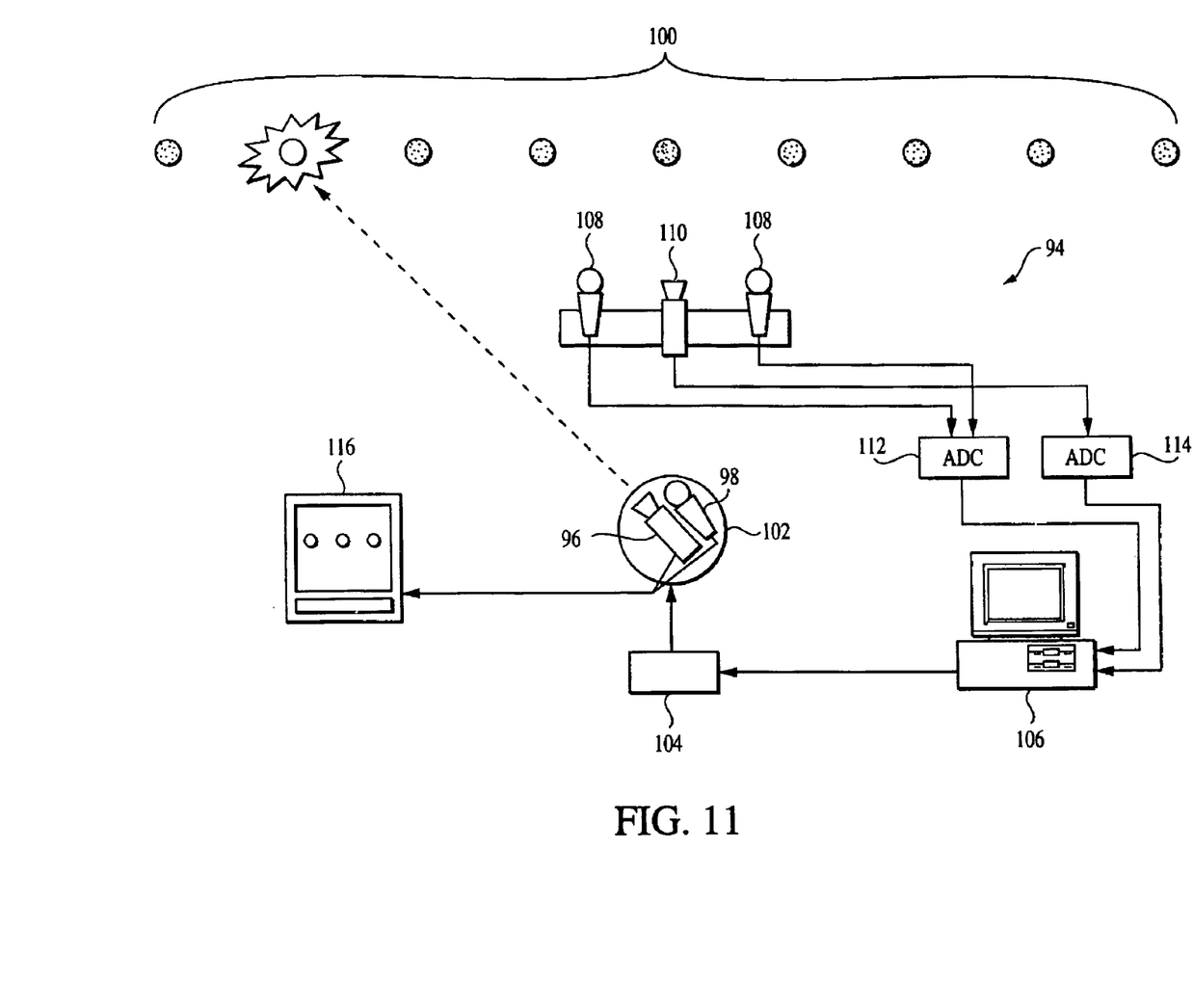
FIG. 11 is block diagram of a self-aiming camera system incorporating the present models for determining target probability.

Turning now to FIG. 11, the above-described embodiments of the present invention for computing the probability of a target is preferably implemented in a self-aiming camera (SAC) system 94 that automatically aims a video camera 96 and a microphone 98 at the most probable target 100 in the environment. The camera 96 and the microphone 98 are mounted on a movable platform 102, which is controlled by a motion controller 104. In the preferred embodiment, the models described above for approximating or estimating Bayes' rule is implemented on a host PC 106. It should be understood, however, that the two-stage adaptive algorithm for approximating target probability may also be implemented in the host PC 106.

The host PC 106 receives audio (A) signals from a separate microphone array 108, and video (V) signals from a stationary camera 110, preferably a wide-angle type. The stationary camera 110 and the microphone array 108 are locked on axis with the rotatable camera 96 and the directional microphone 98. The audio and the video signals from the microphone array 108 and video signals from the stationary camera 110 are first digitized by ADCs 112 and 114, respectively, and sent to the PC 106 to be used in approximating or estimating target probability.

The digitized audio signals from the microphone array 108 consist of approximately 0.25 seconds of data from each of the microphones. The two signals are correlated by the PC 106 to localize the direction to a source measured by relative time of arrival. The correlation is preferably performed using a standard, FFT-based correlation algorithm. Improved performance is achieved by correlating the signals in the left and right microphones 108 that immediately follow abrupt onsets in both audio signals. The onset-directed technique is known in the art. The computed correlation is low-pass filtered, and the time offset corresponding to the maximal, smoothed correlation is chosen to determine the direction to the sound source. In the SAC system 94, the environment is represented as a one-dimensional array of 60 elements, for example. The PC 106 produces a space-map vector of this dimensionality.

The video input signals from the stationary camera 110 consist, for example, of a 640×480 wide-angle monochrome image, updated at a rate of 40 frames per second (fps). The video frames are inherently spatially mapped (2-dimensional). Deep SC neurons in the brain (see FIG. 1) respond preferentially to moving or time varying visual inputs. This is simulated in the PC 106 using a motion detection algorithm, which takes as input two images that are separated by one capture time. For each pixel, both the spatial and temporal intensity gradients are calculated. These are combined using the image brightness constancy equation to determine the normal component of optical flow at each pixel. Optical flow is used as an estimate of motion. The pixel containing the maximal, smoothed optic flow value is chosen to determine the location of the moving visual input source. The resolution of the output of the video motion algorithm is reduced to 60, for example.

A model of the superior colliculus (SC) is implemented in the PC 106 as an array of 60 SC units 16, each representing a deep SC neuron. Each unit 16 receives, directly or indirectly, one input from each of the 60 preprocessed audio and video signals in spatial register. Initially, each SC unit 16 has a non-overlapping receptive field of one pixel, and approximates or estimates Bayes' rule to determine the probability that a target has appeared in its receptive field.

The selection process is implemented by choosing the SC unit 16 that has the largest response to its inputs. Since the SC units 16 are in spatial register with their inputs, localization of the target is determined by the location of the chosen SC unit in the 1-dimensional array. Acquisition of the target then takes place by moving the rotating platform 102 to the coordinate in the environment corresponding to the chosen SC unit, thereby allowing the target 100 to be viewed by the operator through a monitor 116.

If target probability is obtained by estimating Bayes' rule using back-propagation, an array of computer-controlled buzzer/flasher pairs (not shown), spaced every 15 degrees, for example, is used to provide the sensory stimuli for back-propagation training. At each training cycle, one location is chosen at random, and the buzzer and the flasher at that location are activated. The 60 preprocessed audio and video signals are temporally summed or averaged over a window of 1 second and applied as input to the model. The inputs are applied to the model SC units 16 directly, or indirectly through a network of hidden units. The location of the source is specified as a 60 element desired output vector of 59 zeros, and a one at the location in the vector corresponding to the location of the source. The weights are all trained with one cycle of back-propagation, and the process is repeated with a source at a newly chosen, random location.

After training, the inputs are preprocessed as described above over the 1-second window and then applied in spatial register to the SC model 13. Each SC unit 16 then estimates, on the basis of its video and audio inputs, the Bayesian probability that the source is present at its corresponding location in the environment, which simulates MSE. The location of the model SC unit 16 with the largest response is then chosen as the location of the most probable target, and the camera 96 and the microphone 98 are aimed in that direction. The SAC system 94 chooses as targets those objects in the environment that move and make noise, which covers most of the targets actually chosen by the SC in guiding saccadic eye movements in animals.

From the foregoing description, it should be understood that methods for modeling the superior colliculus of the brain have been shown and described which have many desirable attributes and advantages. These models in accordance with the present invention approximate or estimate Bayes' rule to determine the target probability in the environment.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method of determining spatial target probability comprising the steps of:
   acquiring at least two inputs from a location in a desired environment;
   applying said inputs to a plurality of model units in a map corresponding to a plurality of locations in said environment;
   approximating a conditional probability of a first target at each of said model units based on said at least two inputs;
   finding a model unit from said plurality of model units with a highest conditional probability;
   choosing a location in said environment corresponding to said model unit with said highest conditional probability as a location of a next target.

2. The method as defined in claim 1, wherein said at least two inputs are sensory inputs.

3. The method as defined in claim 2, wherein said at least two sensory inputs are video and audio inputs.

4. The method as defined in claim 1, wherein said conditional probability is a posterior probability of said first target given said at least two inputs.

5. The method as defined in claim 4, wherein said posterior probability is approximated using a sigmoid curve function.

6. The method as defined in claim 4, wherein said posterior probability is approximated using a linear function.

7. The method as defined in claim 4, wherein said posterior probability is approximated using a bounded linear function.

8. A method of determining spatial target probability using a supervised learning algorithm in a model of a neural network having a plurality of input units, output units and hidden units connected between said input and output units, said method comprising the steps of:
   training the model neural network to reduce an error between an actual response and a desired response of the neural network to predetermined inputs from a known location in a desired environment;
   applying at least one input associated with a first target located in said desired environment;
   finding an output unit from the plurality of output units with a highest desired value; and
   choosing a location in said environment corresponding to said output unit with said highest desired value as a location of a next target.

9. The method as defined in claim 8, wherein the plurality of output units of the model neural network represent model units in a map corresponding to a plurality of locations in said desired environment.

10. The method as defined in claim 8, wherein said predetermined inputs and said at least one input associated with said first target are sensory inputs.

11. The method as defined in claim 8, wherein said training step includes:
    positioning a training target at a random location in said desired environment;
    applying at least one input associated with said training target to the model neural network to obtain said actual responses of the model neural network to said training target;
    generating said desired responses of the model neural network to said training target;
    finding differences between said actual and desired responses; and
    using back-propagation to reduce said differences between said actual and desired responses.

12. The method as defined in claim 11, wherein said step of using back-propagation includes iteratively adjusting weights associated with the hidden units.

13. The method as defined in claim 10, wherein said sensory inputs include audio and video inputs.

14. An apparatus for automatically tracking a target in a desired environment, said system comprising:
    at least one first sensor for receiving sensory inputs from the target;
    a controller, based on said sensory inputs, for locating the target in the environment using a program modeling a neural network of a brain; and
    at least one directional second sensor for turning to a location in the environment where the target has been located by said controller,
    wherein said model of said neural network includes a map having a plurality of model units corresponding to a plurality of locations in the environment for receiving information from said sensory inputs associated with the target located in the environment through a plurality of input units and connections between said input units and said model units.

15. The apparatus as defined in claim 14 wherein the target is located by approximating a posterior probability of the target given said sensory inputs.

16. The method as defined in claim 15, wherein said posterior probability is approximated using a linear function.

17. The method as defined in claim 15, wherein said posterior probability is approximated using a bounded linear function.

18. The method as defined in claim 15, wherein said posterior probability is approximated using a sigmoid curve function.

19. The apparatus as defined in claim 14 wherein said at least one directional second sensor includes at least one of an audio and a video sensor.

20. The apparatus as defined in claim 14 wherein said at least one first sensor includes at least one audio and at least one video sensor.

21. The apparatus as defined in claim 14 wherein the target is located by a supervised learning algorithm in which,
   said model neural network is trained to reduce an error between an actual response and a desired response of said model neural network to predetermined inputs from a known location in the environment;
   sensory inputs associated with the target located in the environment is applied to said plurality of inputs of said model neural network;
   the model units with a highest desired value is found; and
   a location in the environment corresponding to said model unit with said highest desired value is chosen as a location of a next target.

22. The apparatus as defined in claim 20 wherein said sensory inputs are audio and video signals.

23. The apparatus as defined in claim 21, wherein said model neural network is trained by,
   positioning a training target at a random location in the predefined environment;
   applying sensory inputs associated with said training target to the model neural network to obtain said actual responses of the model neural network to said training target;
   generating said desired responses of the model neural network to said training target;
   finding differences between said actual and desired responses; and
   using back-propagation to reduce said differences between said actual and desired responses.

24. The apparatus as defined in claim 14 wherein the target is located by an unsupervised adaptive algorithm in which,
   said map is adjusted using a Kohonen mechanism to increase an amount of information from said sensory inputs that are transmitted to said map; and
   a strength of said sensory inputs associated with the target is modulated based on a correlation between activities of said map and predefined modulation units, and on anti-correlation between said predefined modulation units and said sensory inputs associated with said target.

25. The apparatus as defined in claim 24 wherein said Kohonen mechanism adjusts weights associated with said connections between said input units and said model units such that each of said model units become specialized for receiving information indicating a predetermined location in said environment.

26. The apparatus as defined in claim 25 wherein said model units further become specialized for receiving a predetermined modality of said sensory inputs associated with said target.

27. The apparatus as defined in claim 26 wherein said modality includes at least audio and video inputs.

28. The apparatus as defined in claim 26 wherein said modulation units are predefined according to a modality of said sensory inputs associated with said target.

29. The apparatus as defined in claim 28 wherein said modulation units modulate said strength of said sensory inputs by multiplying weights associated with said sensory inputs.

30. The apparatus as defined in claim 28 wherein said modality includes at least audio and video inputs.

31. The apparatus as defined in claim 28 wherein at least one of said modulation units predefined by a first modality of said sensory inputs becomes active when said map receives information through at least said first modality form said sensory inputs, said at least one of said modulation units decreases modulation of said sensory inputs having first modality and increases modulation of said sensory inputs having modality other than said first modality.

32. A method of determining spatial target probability using an unsupervised adaptive algorithm in a model of a neural network, said method comprising the steps of:
   organizing a map into a plurality of model units corresponding to a plurality of locations in a desired environment for receiving information from sensory inputs associated with a target located in said environment through a plurality of input units and connections between said input units and said model units;
   adjusting said map to increase an amount of said information from said sensory inputs that are transmitted to said map using an unsupervised learning mechanism; and
   modulating a strength of said sensory inputs associated with said target based on a correlation between activities of said map and predefined modulation units, and on anti-correlation between said predefined modulation units and said sensory inputs associated with said target.

33. The method as defined in claim 32, wherein a Kohonen mechanism is used in said step of adjusting said map.

34. The method as defined in claim 33 wherein said Kohonen mechanism adjusts weights associated with said connections between said input units and said model units such that each of said model units become specialized for receiving information indicating a predetermined location in said environment.

35. The method as defined in claim 34 wherein said model units further become specialized for receiving a predetermined modality of said sensory inputs associated with said target.

36. The method as defined in claim 35 wherein said modality includes at least audio and video inputs.

37. The method as defined in claim 35 wherein said modulation units are predefined according to a modality of said sensory inputs associated with said target.

38. The method as defined in claim 37 wherein said modulation units modulate said strength of said sensory inputs by multiplying weights associated with said sensory inputs.

39. The method as defined in claim 37 wherein said modality includes at least audio and video inputs.

40. The method as defined in claim 37 wherein at least one of said modulation units predefined by a first modality of said sensory inputs becomes active when said map receives information through at least said first modality from said sensory inputs, said at least one of said modulation units decreases modulation of said sensory inputs having first modality and increases modulation of said sensory inputs having modality other than said first modality.

* * * * *

UNITED STATES PATENT AND TRADEMARK OFFICE
CERTIFICATE OF CORRECTION

PATENT NO. : 6,795,794 B2
DATED : September 21, 2004
INVENTOR(S) : Anastasio et al.

It is certified that error appears in the above-identified patent and that said Letters Patent is hereby corrected as shown below:

Column 12,
Line 10, delete "form" and insert -- from -- therefor.

Signed and Sealed this

Twelfth Day of July, 2005

JON W. DUDAS
*Director of the United States Patent and Trademark Office*